United States Patent [19]

Wells et al.

[11] Patent Number: 5,048,077
[45] Date of Patent: Sep. 10, 1991

[54] TELEPHONE HANDSET WITH FULL-PAGE VISUAL DISPLAY

[75] Inventors: Benjamin A. Wells, Newton; E. Allen Becker, Brookline, both of Mass.

[73] Assignee: Reflection Technology, Inc., Waltham, Mass.

[21] Appl. No.: 223,552

[22] Filed: Jul. 25, 1988

[51] Int. Cl.$^5$ ...................... H04M 11/00; H04N 1/42
[52] U.S. Cl. ........................................ 379/96; 379/53; 379/433; 358/85
[58] Field of Search ................... 379/96, 110, 53, 54, 379/433; 358/85

[56] References Cited

U.S. PATENT DOCUMENTS

| RE. 28,847 | 6/1976 | Vizenor . | |
| D. 295,411 | 4/1988 | Cho et al. | 379/433 |
| 1,756,232 | 4/1930 | Arnaud | 358/208 |
| 1,766,885 | 6/1930 | Dauvillier | 358/208 |
| 1,979,296 | 11/1934 | Sweeney | 358/208 |
| 2,681,588 | 6/1954 | Dyner . | |
| 2,958,802 | 11/1960 | Hammer et al. | 250/332 |
| 2,989,643 | 6/1961 | Scanlon | 250/230 |
| 3,059,519 | 10/1962 | Stanton . | |
| 3,079,555 | 7/1963 | Daschke . | |
| 3,170,979 | 2/1965 | Baldwin et al. | 340/705 |
| 3,205,303 | 9/1965 | Bradley . | |
| 3,224,332 | 12/1965 | Mikusch | 350/453 |
| 3,278,746 | 10/1966 | Fiat | 250/253 |
| 3,287,559 | 11/1966 | Barnes | 250/316.1 |
| 3,384,140 | 5/1968 | Brothers . | |
| 3,446,980 | 5/1969 | Meier | 250/234 |
| 3,532,408 | 10/1970 | Dostal | 350/486 |
| 3,609,485 | 9/1971 | Dostal . | |
| 3,652,856 | 3/1972 | Paul . | |
| 3,671,766 | 6/1972 | Howe . | |
| 3,704,342 | 11/1972 | Stoddard et al. | 358/113 |
| 3,742,238 | 6/1973 | Hoffman, II . | |
| 3,760,181 | 9/1973 | Daly et al. | 250/332 |
| 3,781,559 | 12/1973 | Cooper et al. . | |
| 3,833,300 | 9/1974 | Rymes . | |
| 3,846,784 | 11/1974 | Sinclair | 340/814 |
| 3,923,370 | 12/1975 | Mostrom . | |
| 3,958,235 | 5/1976 | Duffy . | |
| 4,026,641 | 5/1977 | Bosserman et al. . | |
| 4,081,209 | 3/1978 | Heller et al. . | |
| 4,129,887 | 12/1978 | Michon | 358/213 |
| 4,189,747 | 2/1980 | Funari | 358/126 |
| 4,213,146 | 7/1980 | Maiman . | |
| 4,225,862 | 9/1980 | Johnson | 340/755 |
| 4,232,196 | 11/1980 | Filippi . | |

(List continued on next page.)

FOREIGN PATENT DOCUMENTS

| 0121927 | 10/1984 | European Pat. Off. . | |
| 301801 | 2/1989 | European Pat. Off. | 379/53 |
| 56-30677 | 3/1981 | Japan | 340/781 |
| 57-114116 | 7/1982 | Japan | 350/6.6 |
| 8606238 | 10/1986 | PCT Int'l Appl. . | |

OTHER PUBLICATIONS

Reid, D. A. T., "Micro-Display," 6/79, IBM Technical Disclosure Bulletin, vol. 22, No. 1, p. 362.
Upton, Hubert W. and Goodman, James R., "Eyeglass Heads-Up Display," SID 81 Digest, pp. 48,49.
Upton, Hubert W. and Goodman, J. R., "Eyeglass Heads-Up Display," Proceedings of the SID, vol. 23/2, 1982, pp. 77-80.
Title "IRTV-445 Patented Scanning System", Inframetrics Night Vision System Group, Bedford, MA.
Invention Disclosure, Fritzel et al., "I.D.C. Reaction- Primary Examiner—Jin F. Ng
Assistant Examiner—Stella L. Woo
Attorney, Agent, or Firm—Wolf, Greenfield & Sacks

[57] ABSTRACT

A telephone handset incorporates a miniature virtual image display which can display a full page of text at high resolution. The miniature display is a scanning mirror type of display in which a line image is generated by a line of light-emitting devices such as light emitting diodes (LEDs). A magnifying optical system creates a magnified virtual image of the LED line and the virtual line image is then converted into a virtual raster image by an oscillating mirror. The virtual image can be viewed at distances close to the display so that the display can be viewed while the telephone handset is being used.

18 Claims, 4 Drawing Sheets

5,048,077

Page 2

U.S. PATENT DOCUMENTS

| | | |
|---|---|---|
| 4,248,495 | 2/1981 | Minoura . |
| 4,251,126 | 2/1981 | Minoura et al. ............... 350/6.6 |
| 4,311,999 | 1/1982 | Upton et al. .................. 340/755 |
| 4,340,888 | 7/1982 | Seroskie ....................... 340/755 |
| 4,364,636 | 12/1982 | Ellis ............................. 350/174 |
| 4,415,065 | 11/1983 | Sandstedt ................. 340/825.44 |
| 4,439,157 | 3/1984 | Breglia et al. ............... 350/174 |
| 4,443,075 | 4/1984 | Crane ........................... 351/209 |
| 4,457,580 | 7/1984 | Klose .......................... 350/6.91 |
| 4,470,044 | 9/1984 | Bell ............................. 340/755 |
| 4,538,181 | 8/1985 | Taylor . |
| 4,618,860 | 10/1986 | Mori ........................ 340/825.44 |
| 4,632,501 | 12/1986 | Glynn ........................... 350/6.6 |
| 4,636,866 | 1/1987 | Hattori ......................... 340/705 |
| 4,661,659 | 4/1987 | Nishimura ..................... 379/99 |
| 4,676,582 | 6/1987 | Kato et al. ..................... 350/65 |
| 4,708,420 | 11/1987 | Liddiard ........................ 350/6.6 |
| 4,720,781 | 1/1988 | Crossland et al. ...... 340/825.35 X |
| 4,732,440 | 3/1988 | Gadhok ......................... 350/6.6 |
| 4,752,129 | 6/1988 | Izumi et al. ................... 356/328 |
| 4,753,514 | 6/1988 | Kubik .......................... 350/174 |
| 4,795,223 | 1/1989 | Moss ........................... 353/14 X |
| 4,934,773 | 6/1990 | Becker .......................... 350/6.6 |

OTHER PUBLICATIONS less Mirror Drive Concept," Hughes Aircraft Company, May 1975.

OKI Technical Review 123, vol. 52, publication "High--Resolution Display Using Light-Emitting Diode Arrays, " Abiko et al., 1/86, pp. 46–50.

Invention Disclosure, "Beam Stabilization and Auto Alignment System," Hughes Aircraft Company, 9/76, Report No. P76-361.

"Conversational Terminal," Cermetek Microelectronics, 4/87.

"Lifestyle Personal Communicator", AudioBionics Inc., Hearing Instruments, vol. 36, No. 1, 1985.

Machine Design, 6/12/86, "Lineman's Handset Answers All Question," p. 46.

Leon, N. M., "Projected Image Display," 6/79, IBM Technical Disclosure Bulletin, vol. 22, No. 1, pp. 363–365.

"Conversational Terminal", Cermetek Microelectronics, 4/87.

"Lifestyle Personal Communicator", AudioBionics Inc., Hearing Instruments, vol. 36, No. 1, 1985.

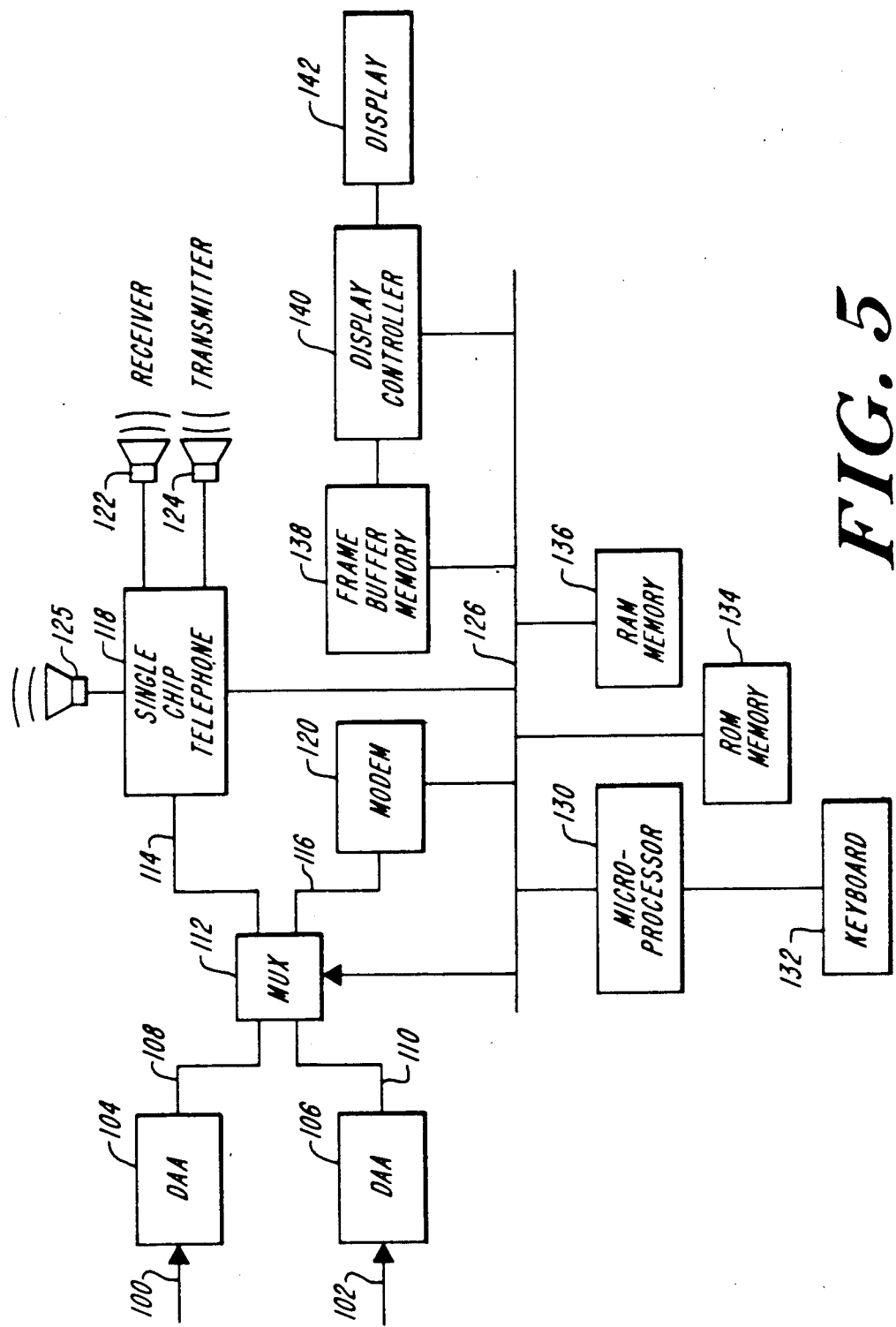

TELEPHONE HANDSET WITH FULL-PAGE VISUAL DISPLAY

FIELD OF THE INVENTION

This invention relates to telephone sets which display data, more specifically to telephone sets that have a visual display in the handset.

BACKGROUND OF THE INVENTION

Many conventional telephone communication systems incorporate visual display capabilities which allow information to be displayed. Prior art devices include: telephones with liquid crystal displays (LCDs) mounted on the telephone base or in the handset; wall-mounted pay telephones with built-in cathode ray tube (CRT) displays and computerized communication systems which combine a telephone with a modem or other communication device.

At the present time the use of such display devices is either limited to the display of small amounts of information such as dialed numbers, names, memoranda and low-resolution graphic data or confined to "desk-top" size units with conventional full-sized displays. However, with the conversion of the existing voice grade telephone network to a network which can transmit both voice signals and data signals, the need will increase for relatively high-resolution visual displays at the telephone to display the large amount of transmitted data.

For certain applications, such as business offices, a conventional CRT or large-size, flat-panel LCD display may be integrated into the telephone base in order to provide the capability of rapidly displaying large amounts of data. In other situations, however, restricted space will not allow use of a "full-size" data display. For example, telephones designed for home use, mobile telephones, and wall-mounted telephones are generally designed to minimize side and thus could not easily incorporate a conventional size CRT display.

Even if there is space for conventional displays, the relatively high cost of a conventional high-resolution display, such as a full-size flat-panel LCD, make the use of such displays undesirable in applications where the need to display data is occasional. For example, office or factory extension telephones and pay telephones generally are used so infrequently for data display that the cost of equipping such telephones with conventional full-size displays would be unecomonical. Although these telephones could be economically equipped with conventional one or two line LCD displays these latter displays can only display a small amount of alphanumeric data.

In order to overcome the present limitations of full-size visual displays, some well-known techniques have been used to "enlarge" small displays and make them easier to view. Normally, a visible real image can be no larger than the physical display enclosure. However, it is possible to create an enlarged image by magnifying the real image produced by a small conventional display. This technique is presently used in the viewfinders of some conventional video cameras. Although this technique could be applied to telephone displays, a problem with this approach is that the magnification does not significantly increase the resolution of the initial display, it merely makes the small display easier to see. Thus, with a conventional display generated on a small CRT, the resolution of the initial image and, consequently, the resolution of the magnified image is not high enough to adequately display a full page of text or to display graphics information. It is possible to use a high-resolution CRT to generate the initial image. Conventional miniature CRTs exist which are capable of displaying a full page of text or graphics, but these CRTs are expensive and have the normal drawbacks associated with CRTs such as power supply problems and reliability.

Consequently, the relationship of case size to image size has meant that only very small displays could be incorporated into the limited space available in telephone handsets. A further problem with conventional displays is that they generally require that the user hold the handset at a comfortable reading distance to view the display whereas the user must place the handset near his ear to use the telephone. Thus, it is not possible to simultaneously use the telephone and view the display.

Accordingly, it is an object of the present invention to provide a telephone handset which has the ability to display a full page of text or graphics information.

It is another object of the present invention to provide a telephone handset which incorporates the ability to display a full page of text or graphics information without physically increasing the size of the telephone.

It is another object of the present invention to provide a telephone handset in which a full-page display can be viewed while simultaneously speaking and listening on the telephone.

It is still another object of the present invention to provide a telephone handset which incorporates a high-resolution visual display which is compact and space-efficient.

It is yet another object of the present invention to provide a telephone handset which incorporates a high-resolution visual display on which displayed data can only be seen by user of the telephone.

SUMMARY OF THE INVENTION

The foregoing problems are solved and the foregoing objects are achieved in one illustrative embodiment of the invention in which a telephone handset incorporates a miniature virtual image display which can display a full page of text at high resolution. The miniature display is a scanning mirror type of display in which a line image is generated by a line of light-emitting devices such as light emitting diodes (LEDs). A magnifying optical system creates a magnified virtual image of the LED line and the virtual line image is then converted into a virtual raster image by an oscillating mirror. Information fed into the LEDs is properly synchronized with the motion of the mirror so that a high resolution virtual image can be viewed in the mirror. With proper design of the optical system, the virtual image can be viewed at distances close to the display so that the display can be viewed while the telephone handset is being used. A typical virtual-image scanning display can accomodate a "full-page" (80-column by 24 line) display of text characters or the equivalent graphical display (280 by 720 pixels).

The inventive arrangement generates a high-resolution two-dimensional image with a relatively low cost because it does not merely enlarge an existing two dimensional image but rather creates a two-dimensional virtual image from a one dimensional line image. The technology used to generate the one dimensional line image can be implemented with considerably less expense than a high-resolution two dimensional real image.

BRIEF DESCRIPTION OF THE DRAWINGS

FIG. 5 is a block electrical schematic of the circuitry used to display information on the display shown in FIG. 4 in a communication system in which two telephone lines are used to transmit and receive both voice and data.

DETAILED DESCRIPTION OF THE PREFERRED EMBODIMENT

Figure 1:
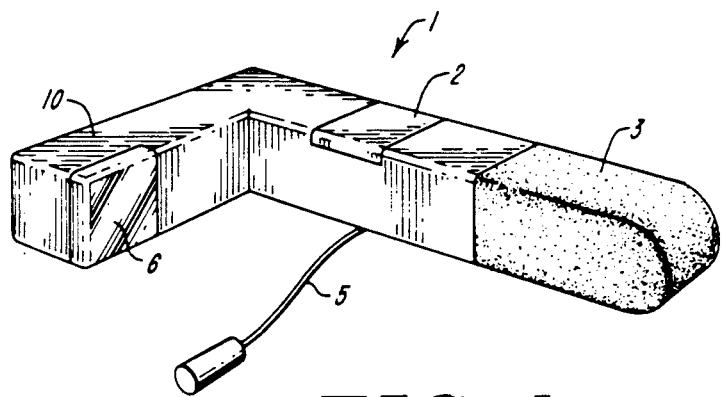
FIG. 1 shows a perspective view of an illustrative embodiment of a telephone handset which incorporates a miniature scanner display.

FIG. 1 shows an illustrative embodiment of a telephone handset 1 which incorporates a miniature visual display. The handset is shown without a base and may illustratively be used with a conventional telephone base or can be directly connected to the telephone line without a base. If a base is used, handset 1 would be connected to the base (not shown) by a conventional cord (not shown).

Figure 2:
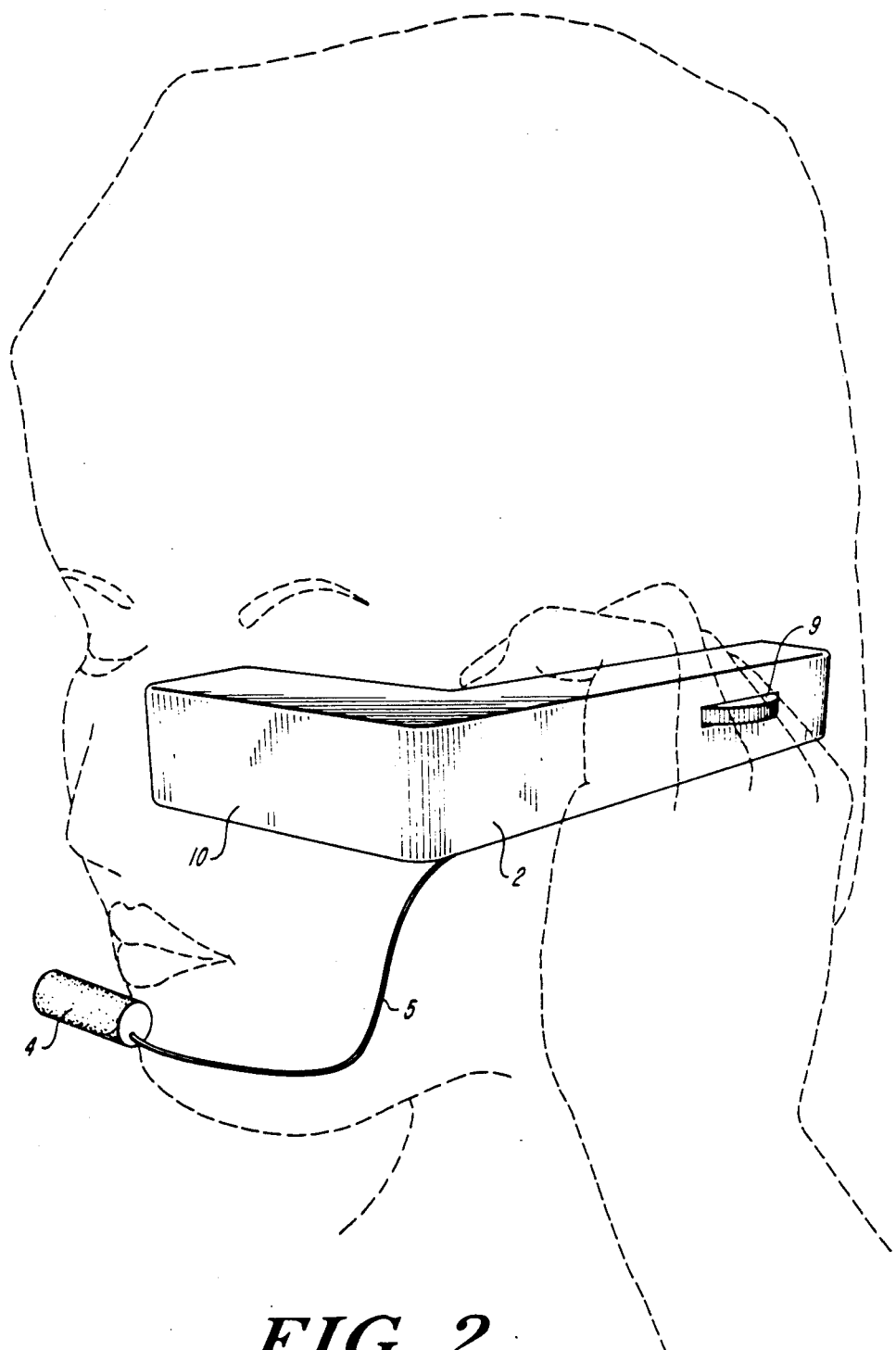
FIG. 2 shows a perspective view of an illustrative embodiment of a telephone handset which incorporates a miniature scanner display in use.

The illustrative handset 1 consists of a body 2 which has a conventional receiver 3 mounted on one end. The other end of body 2 is connected to a light-tight box 10 in which the miniature scanning display is housed In order to allow the user to talk, a microphone 4 mounted on a flexible stalk 5 is provided. In use, as shown in FIG. 2 the user would place receiver 3 against his ear and speak into the microphone 4. The "L-shaped" design allows the display device to be viewed through window 6 in light-tight box 10. Also shown in FIG. 2 is a focusing knob 9 (that would normally be covered by the user s hand) which would allow the user to adjust the display focus to suit his preference.

The illustrative embodiment is suitable for right or left hand use by simply flipping the unit over. A manual or gravity-sensitive switch (not shown) is provided to rotate the displayed image when the unit is flipped.

Figure 3:
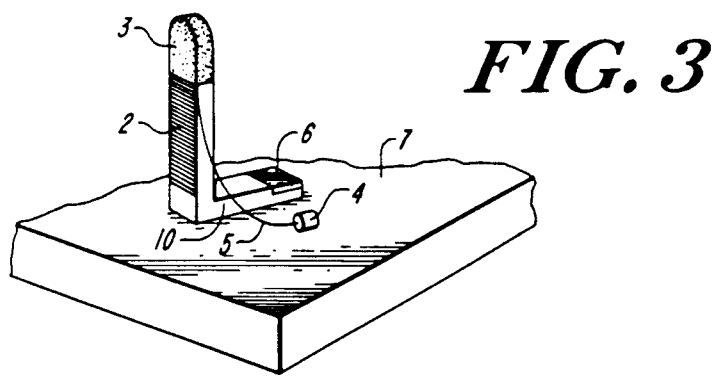
FIG. 3 shows another perspective view of the embodiment shown in FIG. 1 resting on a table top when the handset is not in use.

FIG. 3 shows the same telephone unit 1 resting on a table top 7 when not in use and when used without a base. When used without a base a conventional hook switch (not shown) would be used to disconnect the telephone line when the unit is not in use.

Figure 4:
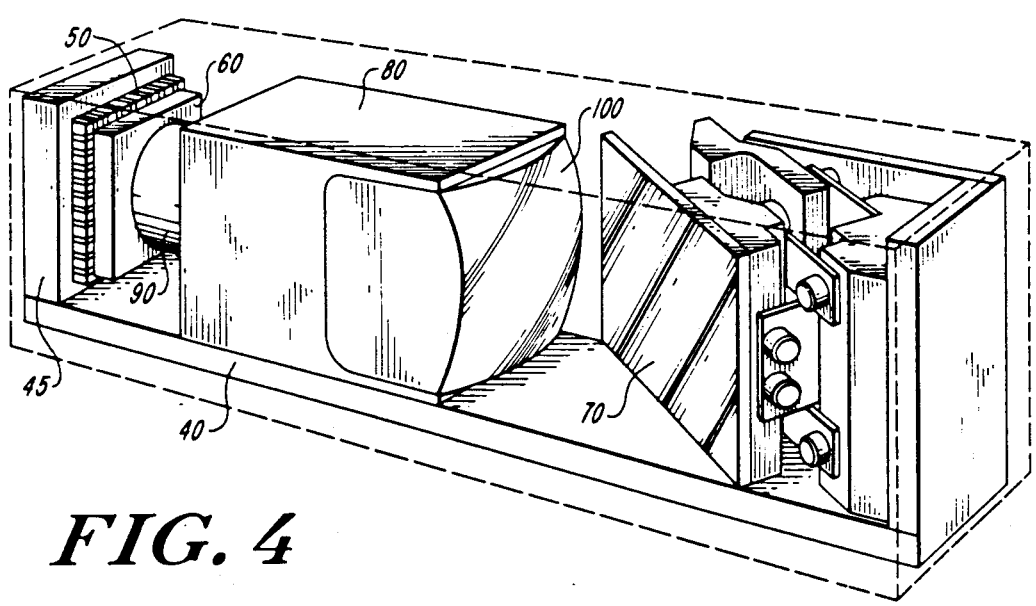
FIG. 4 shows a perspective view of a scanning display mechanism which can be used with the illustrative embodiments shown in FIGS. 1-3.

FIG. 4 of the drawing shows a illustrative embodiment of a miniature display device which can be included in box 10 to develop a raster image for the display of information. The miniature display device is of the type described in detail in copending U.S. Patent application entitled *Miniature Video Display System*, filed on July 27, 1987 under Ser. No. 078,295 and assigned to the same assignee as the present invention (now U.S. Pat. No. 4,934,773) and copending U.S. Pat. application entitled *Low Vibration Resonant Scanning Unit for Miniature Optical Display Apparatus* filed on May 31, 1988 under Ser. No. 200,645 and assigned to the same assignee as the present invention (now U.S. Pat. No. 4,902,083). The operation and construction of the display device is discussed in detail in those applications, both of which are hereby incorporated by reference, and will not be repeated in detail herein for clarity. The display device consists of a base 40 on which the various optical components which comprise the display are mounted. At one end of base 40 is mounted the header block 45 in which an array of light-emitting devices 50 (such as light-emitting diodes) is attached. Generally, such an array may be a linear array comprising two rows of devices which are staggered in order to compensate for gaps between the devices. The devices are covered by a clear cover plate 60.

Light emitted from devices 50 is projected via mirror 70 by means of an optical system which consists of housing 80 in which are mounted lenses 90 and 100. In accordance with the principles set forth in the aforementioned U.S. Pat. application Ser. No. 078,295, the lens system projects an enlarged virtual image of array 50 via mirror 70.

As described in the above-described patent applications, mirror 70 is oscillated by an electromechanical drive motor (not shown). The oscillation of mirror 70, in turn, creates a raster image from linear array 50.

Figure 6:
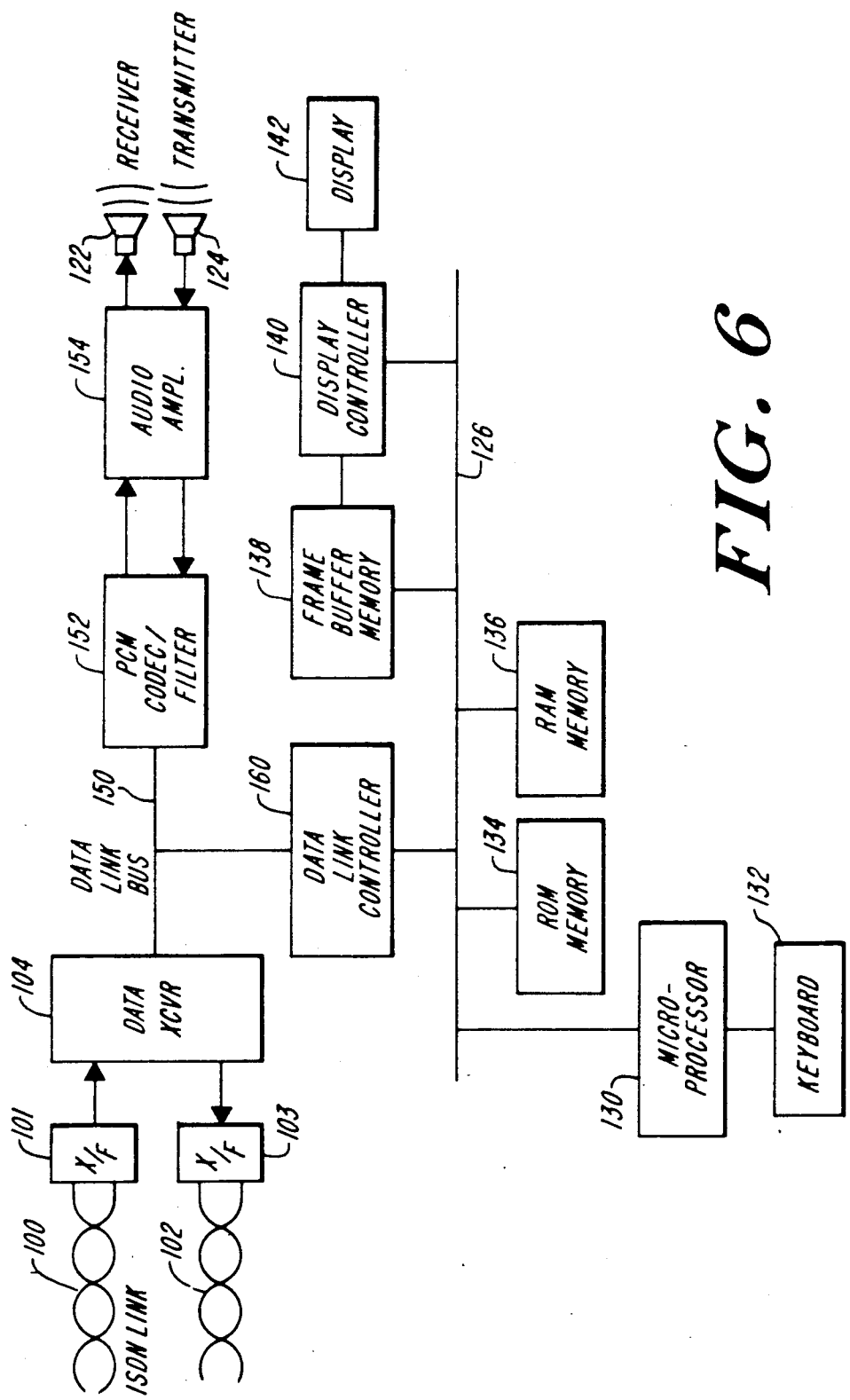
FIG. 6 is a block electrical schematic of the circuitry used to display information on the display shown in FIG. 4 in an ISDN communication system in which a single telephone line is used to transmit and receive both voice and data.

FIGS. 5 and 6 are block electrical schematic diagrams of two different embodiments of handset circuitry which enable the telephone to transmit and receive both voice and data signals. After reception the data signals are displayed on the display device. In accordance with the invention, an entire page of display information can be displayed at once on the illustrative scanning display.

The embodiment shown in FIG. 5 can be used with available telephone lines. In order to carry on simultaneous voice and data transmission, two two-wire telephone lines are required. Alternatively, the device can be used with a single telephone line but the voice and data signals must be multiplexed onto the single line and, thus, simultaneous voice and data transmission is not possible.

More particularly, two conventional telephone lines 100 and 102 are connected to allow simultaneous transmission of voice and data. In particular, telephone line 100 is connected to a data access (DAA) device 104. Device 104 is a conventional hybrid circuit which is required by regulatory agencies to connect any equipment to telephone lines. Its construction and use are well-known. In the same manner, telephone line 102 is connected to a second DAA device 106. The output of DAA device 104 is provided, via signal path 108, to multiplexer 112. Although path 108 is shown as a single wire, it would, in fact, consist of two or more wires in order to carry the analog signals produced by DAA device 104. Similarly, DAA device 106 is connected by signal path 110 to multiplexer 112.

Multiplexor 112 is a conventional analog multiplexer which is, in turn, operated by control signals on data bus 126 generated by microprocessor 130. Multiplexor 112 consists of a set of relay switches which can be controlled by microprocessor 130 in order to connect modem 120 or telephone chip 118 to either of telephone lines 100 and 102.

Modem 120 is a conventional modulator/demodulator circuit which incorporates serial to parallel conversion circuitry and which converts the analog signals produced by DAA device 104 to digital signals which are used by microprocessor 130 in order to display information on display 142.

Telephone chip 118 is a conventional commerically-available integrated circuit chip which implements the functions needed for a voice-grade telephone, including off-hook detection and multi-frequency tone generation. The function and operation of the circuitry contained on this chip are well-known and will not be discussed further herein. Chip 118 is connected to a conventional receiver 122, microphone 124 and telephone ringer unit 125. In the application shown in FIG. 5, telephone chip 118 is controlled, via data bus 126, by microprocessor 130 by means of signals which would normally be generated by the dial push-buttons. Conventional telephone chips have been designed in order to work in this manner.

Under control of microprocessor 130, multiplexer 112 can connect modem 120 and telephone chip 118 to telephone lines 100 and 102 to provide two modes of operation. In "two-line" operation, multiplexer 112 connects line 100 directly to chip 118 and line 102 directly to modem 120. These connections allows simultaneous voice and data transmission and reception. Analog voice information on line 100 then passes to chip 118. On line 102, digital information, which is generally encoded by tones, is passed to modem 120 which converts the tones into digital signals that can be manipulated by microprocessor 130.

However, in "single-line" applications where two telephone lines are not available, both modem 120 and chip 118 can be connected by multiplexer 112 to line 100 in an alternating fashion. This allows for the voice and data transmission over a single telephone line, although not simultaneously.

Microprocessor 130 is, in turn, controlled by a program stored in read only memory (ROM) 134. This program is written in a straightforward fashion and enables microprocessor 130 to recognize, receive and format incoming and outgoing data. Alternatively, microprocessor 130 can be controlled by signals generated from keyboard 132 which can be optionally added to the telephone handset or may comprise the dial push-buttons normally found on the handset.

Information and data generated by microprocessor 130 and received via modem 120 is temporarily stored in random access memory (RAM) 136. Under control of microprocessor 130 information stored in RAM memory 136 can be transferred to frame buffer memory 138.

In accordance with the invention, frame buffer memory 138 stores an entire "page" of display information (approximately 1920 characters) all of which can be displayed by the scanning display and viewed by the user. Such a display is possible because the "virtual" image of the scanner display display allows the physical size of the display to be reduced while the display maintains sufficient resolution to display a "page" of information.

The information stored in frame buffer 138 is displayed on the display 142 under control of display controller 140 as previously described. The operation of frame buffer 138 and display controller 140 in order to display information on display 14 is described in detail in the aforementioned U.S. Pat. application Ser. No. 078295 and will not be discussed further in detail.

Also not shown in a conventional power supply which may operate on power received over the telephone line or may receive power from a local source, such as a wall-mount power supply.

The embodiment shown in FIG. 6 requires the use of an Integrated Services Data Network (ISDN) in which both voice and data can be carried over the same transmission system. Although such a network is not widely available in the United States, work on an ISDN standard is underway and a few trial installations exist. The circuitry in FIG. 6 is similar to that shown in FIG. 5 with the exception that the portion of the circuitry which supports the external connections is designed to work with an ISDN data link.

Under the current ISDN standards, voice and data information is distributed within an office or other work environment on two twisted-pair data lines which must be transformer coupled to receivers and transmitters. Both the voice and data information consist of digital pulse-code modulated signals so that both types of signals may be transmitted over the same line. Two lines are needed for full duplex or simultaneous two way operation.

In particular, twisted-pair data link 100 is connected by transformer 101 to data transmitter/receiver unit 104. Similarly, twisted-pair data link 102 is connected by transformer 103 to transmitter/receiver 104. Transmitter/receiver 104 is a well known unit which provides synchronization, detection and formatting of the incoming and outgoing data. The output of transmitter/receiver 104, which consists of digital data and control words, is applied to data link bus 150. Data link bus 150, although shown as a single line, in fact consists of a pair of specialized serial busses—one bus carries data and one bus carries control information.

The information flow on bus 150 is managed by a data link controller unit 160 which responds to the control information and supervises the transmission of data between transmitter/receiver unit 104 and PCM coded/filter 152 and between transmitter/receiver unit 104 and microprocessor 130. PCM coded/filter 152 is a well-known circuit consisting of an encoder/decoder unit and a filter. The encoder/decoder unit can decode and encode pulse code modulated signals. Digital information on bus 150 is decoded by the encoder/decoder unit and provided to the filter portion of the unit which converts the decoded information to an audio-frequency analog signal. The analog signal produced at the output of coded/filter 152 is provided to an audio amplifier 154 which, in turn, drives the receiver 122.

Similarly, audio signals generated by microphone 124 and amplified by amplifier 154 are encoded into digital signals by unit 152 and transmitted via bus 150 to transmitter/receiver unit 104.

The construction and operation of transmitter/receiver 104, coded/filter 152 and data link controller 160 are dependent on the ISDN standard with which they are intended to operate. For the current ISDN standard, several commercially available integrated circuits are available. For example, integrated circuits embodying the required functions which are suitable for use with the illustrative embodiment are made by Motorola Semiconductor Products Division located in Phoenix, Arizona. More particularly, Motorola chip MC145474 is suitable for use as the transmitter/receiver 104. Motorola chip MC145488 is suitable for the data link controller and Motorola chip MC145554 is suitable for use as the PCM coded/filter circuit. As these circuits are conventional, their operation will not be explained further herein.

Controller 160 is, in turn, operated by microprocessor 130, via microprocessor bus 126, in the same manner as the previous embodiment discussed in connection with FIG. 5. More particularly, digital data information on data link bus 150 which is to be displayed is transferred through data link controller 160 to microprocessor bus 126 and stored in RAM memory 136. As previously discussed, information in RAM memory 136 ma be transferred to frame buffer memory 138 where it can be displayed on display 142 under control of display controller 140.

What is claimed is:

1. In a telephone handset for connection to a telephone line, said telephone handset having means for receiving voice signals from said telephone line, means for transmitting voice signals to said telephone line and means for receiving non-voice data from said telephone line, the improvement comprising display means responsive to said non-voice data for generating a magnified, virtual-image visual data display comprised of a number of picture elements, said display means comprising a number of light-emitting elements wherein said number of light-emitting elements is less than said number of picture elements.

2. In a telephone handset, the improvement according to claim 1 wherein said display means is capable of displaying a two-dimensional image.

3. In a telephone handset, the improvement according to claim 2 wherein said two-dimensional image is capable of displaying at least 1900 text characters simultaneously.

4. In a telephone handset, the improvement according to claim 1 wherein said display means is positioned so that a user of said telephone can view said visual data display while transmitting and receiving voice signals over said telephone.

5. In a telephone handset, the improvement according to claim 1 wherein said virtual-image visual data display means is positioned relative to an eye of a user so that substantially all of said virtual image can be simultaneously observed without requiring said telephone handset to be moved relative to said eye.

6. In a telephone handset for connection to a telephone line, said telephone handset having means for receiving voice signals from said telephone line, means for transmitting voice signals to said telephone line and means for receiving non-voice data from said telephone line, the improvement comprising:
   display means responsive to said non-voice data for generating a magnified, virtual line image of said data, said display means comprised of a number of light-emitting elements; and
   conversion means for converting said line image into a two dimensional, virtual-image comprised of a number of picture elements, said number of picture elements being greater than said number of light-emitting elements.

7. In a telephone handset, the improvement according to claim 6 wherein said conversion means comprises an oscillating mirror.

8. In a telephone handset, the improvement according to claim 6 wherein said display means further comprises means responsive to said non-voided data for converting said data into digital signals and means responsive to said digital signals for selectively illuminating said light-emitting elements.

9. In a telephone handset, the improvement according to claim 8 wherein said line of light emitting devices is comprised of a sufficient number of devices so that at least 24 lines of text can be simultaneously displayed.

10. In a telephone handset, the improvement according to claim 9 wherein said conversion means comprises an oscillating mirror for reflecting said magnified, virtual image of said light-emitting elements.

11. In a telephone handset, the improvement according to claim 8 wherein said display means further comprises an optical system for generating said magnified, virtual image from said light-emitting elements.

12. A telephone for connection to a telephone line, said telephone comprising,
   receiver means for receiving voice signals from said telephone line;
   transmitter means for transmitting voice signals to said telephone line;
   ringer means responsive to ringing signals on said telephone line for generating an audible ring signal;
   hybrid circuit means for connecting said receiver means, said transmitter means and said ringer means to said telephone line;
   means for receiving digitally-encoded data from said telephone line;
   means for temporarily storing received digitally-encoded data;
   a line of light-emitting devices;
   means responsive to said stored digitally-encoded data for selectively illuminating said light-emitting devices;
   an optical system for generating a magnified, virtual-image of said line of light-emitting devices;
   an oscillating mirror for reflecting said magnified, virtual-image of said line of light-emitting devices to create a two dimensional magnified virtual-image of said digitally-encoded data; and
   a handset which is held by the user of said telephone, said line of light-emitting devices, said optical system and said oscillating mirror being physically located in said handset.

13. A telephone for connection to a telephone line, said telephone comprising,
   a handset which is held by the user of said telephone;
   receiver means located in said handset for receiving voice signals from said telephone line;
   transmitter means located in said handset for transmitting voice signals to said telephone line;
   ringer means responsive to ringing signals on said telephone line for generating an audible ring signal;
   hybrid circuit means for connecting said receiver means, said transmitter means and said ringer means to said telephone line;
   means for receiving digitally-encoded data from said telephone line;
   means for temporarily storing received digitally-encoded data;
   a line of light-emitting devices physically located in said handset;
   means responsive to said stored digitally-encoded data for selectively illuminating said light-emitting devices;
   an optical system physically located in said handset for generating a magnified, virtual-image of said line of lightemitting devices;

an oscillating mirror physically located in said handset for reflecting said magnified, virtual-image of said line of light-emitting devices to create a two dimensional magnified virtual-image of said digitally-encoded data, said oscillating mirror being positioned so that a user of said telephone handset can view said two-dimensional magnified virtual image of said digitally-encoded data while transmitting and receiving voice signals over said telephone handset.

14. A telephone according to claim 13 wherein said oscillating mirror is resonantly driven.

15. A telephone according to claim 14 wherein said light-emitting devices are light-emitting diodes.

16. A telephone according to claim 15 wherein said optical system comprises at least one lens located between said line of light-emitting diodes and said oscillating mirror.

17. A telephone according to claim 16 wherein said line of light-emitting diodes includes a sufficient number of diodes and said oscillating mirror oscillates over a sufficient angle that a user of said telephone can view at least 1900 text characters simultaneously.

18. In a telephone handset for connection to a telephone line, said telephone handset having means for receiving voice signals from said telephone line, means for transmitting said voice signals to said telephone line and means for receiving non-voice data from said telephone line, the improvement comprising means responsive to said non-voice data for generating a magnified, virtual image of visual display capable of displaying at least approximately 1,920 characters of text simultaneously.

* * * * *

UNITED STATES PATENT AND TRADEMARK OFFICE
CERTIFICATE OF CORRECTION

PATENT NO. : 5,048,077
DATED : September 10, 1991
INVENTOR(S) : Benjamin A. Wells and Allen E. Becker It is certified that error appears in the above-identified patent and that said Letters Patent is hereby corrected as shown below:

In Claim 8, line 3, delete "non-voided" and insert --non-voice--.

Signed and Sealed this

Sixteenth Day of March, 1993

*Attest:*

STEPHEN G. KUNIN

*Attesting Officer*     Acting Commissioner of Patents and Trademarks